US 8,990,498 B2

(12) United States Patent
Sukonik et al.

(10) Patent No.: US 8,990,498 B2
(45) Date of Patent: *Mar. 24, 2015

(54) ACCESS SCHEDULER

(71) Applicant: Marvell International Ltd., Hamilton (BM)

(72) Inventors: Vitaly Sukonik, Katzir (IL); Sarig Livne, Ramat Gan (IL); Bengt Werdin, Alvsjo (SE)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/091,940

(22) Filed: Nov. 27, 2013

(65) Prior Publication Data

US 2014/0115254 A1    Apr. 24, 2014

Related U.S. Application Data

(63) Continuation of application No. 13/005,473, filed on Jan. 12, 2011, now Pat. No. 8,615,629.

(60) Provisional application No. 61/295,794, filed on Jan. 18, 2010.

(30) Foreign Application Priority Data

Jan. 18, 2010    (SE) ...................................... 1050044

(51) Int. Cl.
  *G06F 12/02*    (2006.01)
  *G06F 12/08*    (2006.01)
  *G06F 13/18*    (2006.01)

(52) U.S. Cl.
  CPC ................ *G06F 12/08* (2013.01); *G06F 13/18* (2013.01)
  USPC ............ 711/117; 711/154; 711/156; 711/158

(58) Field of Classification Search
  CPC .................................. G06F 12/08; G06F 13/18
  USPC .................................. 711/117, 154, 156, 158
  See application file for complete search history.

(56) References Cited

U.S. PATENT DOCUMENTS 5,450,564 A    9/1995  Hassler et al.
5,495,339 A    2/1996  Stegbauer et al.

(Continued)

FOREIGN PATENT DOCUMENTS

CN    1713163 A    12/2005
CN    101038574 A    9/2007
CN    101344871 A    1/2009

OTHER PUBLICATIONS

Sep. 3, 2013 Office Action issued in Chinese Patent Application No. 201110008985.9 (with English translation).

(Continued)

*Primary Examiner* — Stephen Elmore

(57) ABSTRACT

Embodiments of the present invention provide a system for scheduling memory accesses for one or more memory devices. This system includes a set of queues configured to store memory access requests, wherein each queue is associated with at least one memory bank or memory device in the one or more memory devices. The system also includes a set of hierarchical levels configured to select memory access requests from the set of queues to send to the one or more memory devices, wherein each level in the set of hierarchical levels is configured to perform a different selection operation.

23 Claims, 9 Drawing Sheets

(56) References Cited

U.S. PATENT DOCUMENTS

Figure 1:
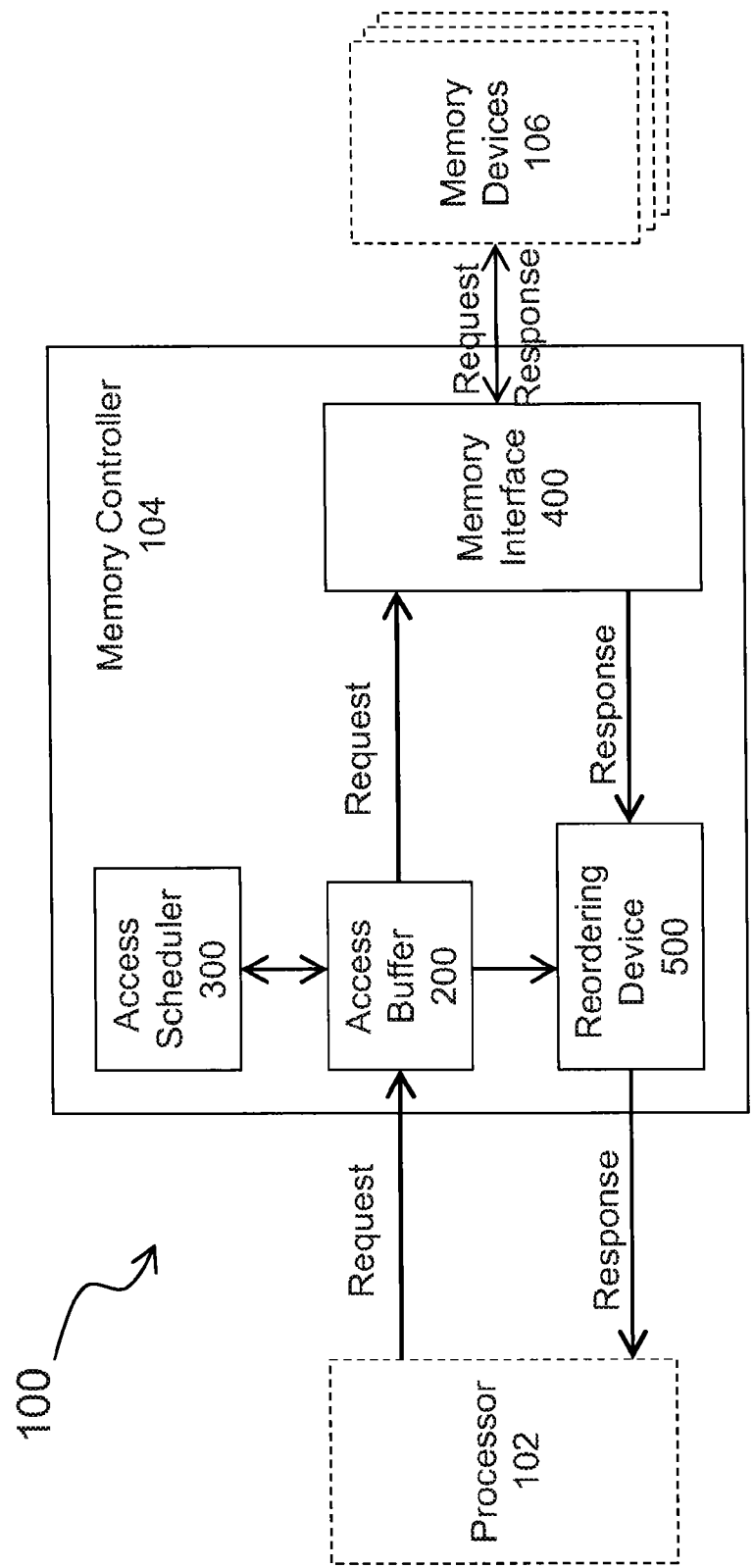

| | | | |
|---|---|---|---|
| 6,385,708 B1 | 5/2002 | Stracovsky et al. | |
| 6,526,484 B1 | 2/2003 | Stacovsky et al. | |
| 6,564,304 B1 | 5/2003 | Van Hook et al. | |
| 6,654,860 B1 | 11/2003 | Strongin et al. | |
| 7,646,779 B2 * | 1/2010 | Kumar et al. | 370/408 |
| 8,180,975 B2 | 5/2012 | Moscibroda et al. | |
| 8,271,741 B2 | 9/2012 | Mutlu et al. | |
| 2004/0236921 A1 | 11/2004 | Bains | |
| 2007/0121499 A1 * | 5/2007 | Pal et al. | 370/230 |
| 2007/0156946 A1 | 7/2007 | Lakshmanamurthy et al. | |

OTHER PUBLICATIONS

Office Action issued May 22, 2014 in Chinese Patent Application No. 201110008985.9 (submitting English language translation only).

Dec. 1, 2014 Office Action issued in Chinese Patent Application No. 201110008985.9 (with English language translation), pp. 1-19.

* cited by examiner

ACCESS SCHEDULER

RELATED APPLICATIONS

This application is a continuation of U.S. patent application Ser. No. 13/005,473, filed Jan. 12, 2011, which claims the benefit of U.S. Provisional Patent Application No. 61/295,794, filed Jan. 18, 2010, and also claims priority under 35 U.S.C. §119 to Swedish Patent Application No. 1050044-5, filed Jan. 18, 2010. The disclosures of the applications reference above are incorporated herein by reference.

TECHNICAL FIELD

The present invention relates to an access scheduler for scheduling access to one or more memory devices such as one or more dynamic random access memories (DRAM) used for packet buffering. The invention also relates to a memory controller comprising such an access scheduler and to a data processing system comprising the memory controller.

BACKGROUND OF THE INVENTION

Packet buffers, for example queuing devices, are often implemented using a dynamic random access memory (DRAM) because of its low cost and low power. However, a DRAM imposes a challenge due to its long latency and its constraints on random accesses. A DRAM is organized in banks and physical properties of the DRAM impose restrictions on bank accesses. For example, the access parameter row-cycle time, tRC, gives the minimum time between an access to a row in a DRAM bank and a consecutive access to another row in the same DRAM bank. Another access parameter, the rolling time frame, tFAW, in which a maximum of four row activations one the same DRAM device may be engaged concurrently restricts the number of row activate commands within a time window. A row is a part of bank. A row must be activated before a read or write to an address within the row can be performed.

A memory controller for a DRAM receives read and write requests targeting different banks of the DRAM. As the DRAM bandwidth in terms of accesses per time unit is often a bottleneck, the memory controller for a DRAM may rearrange the order of read and write requests such that the utilization of the memory interface is maximized.

One optimization is to access the banks cyclically in a fixed order, thus ensuring that the time between two consecutive accesses to any DRAM bank is greater than or equal to the row-cycle time, tRC.

Another optimization is to rearrange read requests and write requests such that multiple read requests are followed by multiple write requests; e.g. rearranging the sequence S1=(R1, W2, R3, W4) to S2=(R1, R3, W2, W4) where R stands for Read, W stands for Write and the number indicates the order in which the requests are received by the memory controller. There is usually a bandwidth penalty for turning between read and write accesses to the DRAM, so S2 is completed in shorter time than S1.

The published US application US 2004/0236921 A1 to Bains discloses a method to improve bandwidth on a cache data bus so that cache memories, such as DRAMs, can be more efficiently used. In one embodiment, the read or write accesses are reordered to efficiently utilize the bandwidth on the data bus.

The U.S. Pat. No. 6,564,304 B1 to Van Hook et al. discloses a memory processing system for accessing memory in a graphics processing system, wherein a memory controller arbitrates memory access request from a plurality of memory requesters. Reads are grouped together and writes are grouped together to avoid mode switching.

However, reordering of accesses, such as read and write accesses may cause logical errors; e.g., if an address in the DRAM bank is read before getting written. For example, in the sequences S1=(R1, W2, R3, W4) and S2=(R1, R3, W2, W4) mentioned above, W2 and R3 may access the same bank address. If W2 writes an element of a data structure; e.g., a linked list, and R3 accesses the same element of the data structure, a logical error would occur if W2 and R3 are reordered as in S2 since that would make a program to read the address before it has been written to. That is, reordering would make a program parsing the linked list to use a stale pointer, causing program failure.

The published US application US 2007/0156946 A1 to Laskshmanamurthy et al. discloses a memory controller with bank sorting and scheduling. The memory controller comprises a FIFO buffer, an arbiter, a bank FIFO set and a bank scheduler. Outputs from the FIFO buffer are fed into the arbiter that sorts memory request into appropriate bank FIFOs. The arbiter may use a round robin arbitration scheme to sort and prioritize the input request streams. The bank scheduler receives the outputs from the bank FIFO sets and processes the requests in rounds. In each round the bank scheduler may select the transactions that optimize read/write efficiency, e.g. the bank scheduler may group reads and/or writes to minimize read-write turn-arounds.

In US 2007/0156946 A1 the problem of logical errors as described above is solved by an "out-of-order" mechanism that ensure that the transaction ordering rules governing reads and writes to the same address are never violated, i.e. that an address cannot be read before it has been written to.

A drawback/problem with the memory controller of US 2007/0156946 A1 is that it does not provide weighed, fair sharing of memory bandwidth. By storing read and write memory requests in the same bank FIFO, the sharing between read and write is determined by the request arrival process and not regulated by the memory controller.

Further, the memory controller of US 2007/0156946 A1 has an arbiter which ensures that e.g. a read request is not issued before a write request if these requests are for the same address. Thus the read request to DRAM is issued despite the existence of the data to be read in the internal storage of the memory controller. This means that DRAM bandwidth is not utilized optimally and read latency is not minimized.

Furthermore, the memory controller of US 2007/0156946 A1 has no means to prioritize requests that need low latency, e.g. requests related to control information, such that they are served before requests that tolerate longer latency, e.g. requests related to packet data.

SUMMARY OF THE INVENTION

It is an aim of the present invention to overcome the problems and/or drawbacks with the prior art. By the present invention, sharing and optimization of DRAM bandwidth is provided. Further, an inventive access scheduler configured to set bit masks per DRAM banks or per DRAM device (group) makes the access scheduler to perform open loop control of DRAM accesses in synchronisation with a memory interface, i.e. when the access scheduler emits a sequence of commands they are guaranteed to be executed by the memory interface at the same rate as they are emitted by the access scheduler.

An embodiment of the inventive access scheduler for scheduling access to one or more memory devices, comprises:
a first hierarchical level comprising:
one or more bank timers configured to set a mask bit for each bank of the memory device when a FIFO queue associated with the bank is accessed, the FIFO queue storing request information relating to access requests; and
one or more first level arbiters (304) configured to select an access request from one FIFO queue of a plurality of FIFO queues and to propagate eligibility information regarding the one FIFO queue to a next hierarchical level; and
a fourth hierarchical level comprising:
a fourth level arbiter configured to receive propagated eligibility information; and to select a request based on the propagated eligibility information.

In embodiments, the fourth level arbiter is further configured to select a request based on a refresh request generated by a finite state machine.

In embodiments, the finite state machine is configured to control the number of access request of a first type, e.g. read requests, to be executed before switching to a number of access requests of a second type, e.g. write requests.

Embodiments further comprise a fifth hierarchical level comprising:
a fifth level arbiter configured to select between an access request to a first memory device and an access request to a second memory device.

Embodiments further comprise:
a second hierarchical level comprising one or more second level arbiters arranged to receive propagated eligibility information from the first level arbiter and configured to perform arbitration between low priority requests and high priority requests and to propagate eligibility information relating to the selected request to a next hierarchical level; and
a third hierarchical level comprising one or more third level arbiters configured to receive the propagated eligibility information from the second level arbiter; to receive management requests from a management request unit, to select a request based on the propagated eligibility information and the management requests; and to propagate eligibility information relating to the selected access request to a next hierarchical level.

Embodiments further comprise a refresh timer configured to, based on configuration parameters stored in a configuration parameters unit, instruct the finite state machine to generate the refresh requests.

In embodiments, the refresh request is a maintenance request for the memory device, such as a request to refresh content of the memory device.

In embodiments, the refresh request is sent periodically and is given precedence over other requests.

In embodiments, the configuration parameters relate to the number of read request to execute before a number of write requests are to be executed, or to the number of burst to read before write.

The invention also relates to a memory controller comprising the inventive access scheduler. Embodiments of the memory controller further comprising:
an access buffer connected to the access scheduler and to one or more memory devices, and configured to receive one or more access requests to the one or more memory device from a processor connected to the memory controller, and
a reordering device connected to the access buffer, and configured to receive response data from the one or memory devices, to sort the received response data such that access responses to the processor are made in the same order as the processor (102) sent the access requests.

The invention also relates to a method for scheduling access to one or more memory devices, comprising the step of providing an access scheduler having:
a first hierarchical level comprising:
one or more bank timers configured to set a mask bit for each bank of the memory device when a FIFO queue associated with the bank is accessed, the FIFO queue storing request information relating to access requests; and
one or more first level arbiters configured to select an access request from one FIFO queue of a plurality of FIFO queues and to propagate eligibility information regarding the one FIFO queue to a next hierarchical level; and
a fourth hierarchical level comprising:
a fourth level arbiter configured to receive propagated eligibility information; and to select a request based on the propagated eligibility information, a possible refresh request generated by a finite state machine, and possible masks set by a group timer.

Embodiments of the method further comprising the step of, by means of the finite state machine, controlling the number of access request of a first type, e.g. read requests, to be executed before switching to a number of access requests of a second type, e.g. write requests.

Embodiments of the method further comprising the step of providing a fifth hierarchical level comprising a fifth level arbiter configured to select between an access request to a first memory device and an access request to a second memory device.

Embodiments of the method further comprising the step of providing:
a second hierarchical level comprising one or more second level arbiters arranged to receive propagated eligibility information from the first level arbiter and configured to perform arbitration between low priority requests and high priority requests and to propagate eligibility information relating to the selected request to a next hierarchical level; and
a third hierarchical level comprising one or more third level arbiters configured to receive the propagated eligibility information from the second level arbiter; to receive management requests from a management request unit, to select a request based on the propagated eligibility information and the management requests; and to propagate eligibility information relating to the selected access request to a next hierarchical level.

Embodiments of the method further comprising the step of providing a refresh timer configured to, based on configuration parameters stored in a configuration parameters unit, instruct the finite state machine to generate the refresh requests.

Embodiments of the inventive access scheduler configured to schedule access to a packet buffer, such as a DRAM, have the following features and advantages:
Uses timer-controlled masking to prevent the bank access pattern from violating DRAM constraints such as bank random access time.
Yields a bank access pattern that also prevents DRAM constraints on accesses from causing memory bus stalls.

Alternates between DRAM groups to further gain memory bus bandwidth, where memory devices share address bus across groups but have a dedicated data bus per group.

Makes DRAM accesses of different length; i.e. comprising different amount of data bursts per access as opposed to forcing the processor to make accesses comprising a certain fixed number of bursts per bank and row per request.

Flexibly allocates bandwidth shares to read and write accesses.

Supports high- and low-priority accesses; e.g., for control and data, respectively.

Ultra-high priority for management accesses.

An inventive memory controller comprising the inventive access scheduler is suitable for use in a buffer system, i.e. a system that temporary stores data received on inputs in structures such as queues, awaiting transmission on outputs; e.g., in a traffic manager. A traffic manager is a device that provides bandwidth management to flows in a networking system; e.g., by a combination of mechanisms for queue management, scheduling, traffic shaping and congestion control, but not restricted to such use.

Further such an inventive memory controller yields: high utilization of the memory interface, i.e. sequences of memory requests are reordered such that the rate of memory requests for any sequence is close to that of an optimally reordered sequence; scalability to high bandwidth, i.e. the inventive memory controller is easily adapted to use with an arbitrary number of DRAM devices; bounded latency, i.e. the time from sending a request that requires a response from the memory controller; e.g. a read request, has a known upper limit; controlled sharing of memory bandwidth between access types, i.e. a known (e.g. a minimum) share of DRAM bandwidth may be allocated to an access type; e.g. read accesses or write accesses; and no reordering of data with respect to request order, i.e. if a processor makes a first request followed by a second request to the memory controller, where both requests trigger responses (e.g. read requests), the memory controller returns the response to the first request before the response to the second request.

DETAILED DESCRIPTION OF THE DRAWINGS

Figure 2:
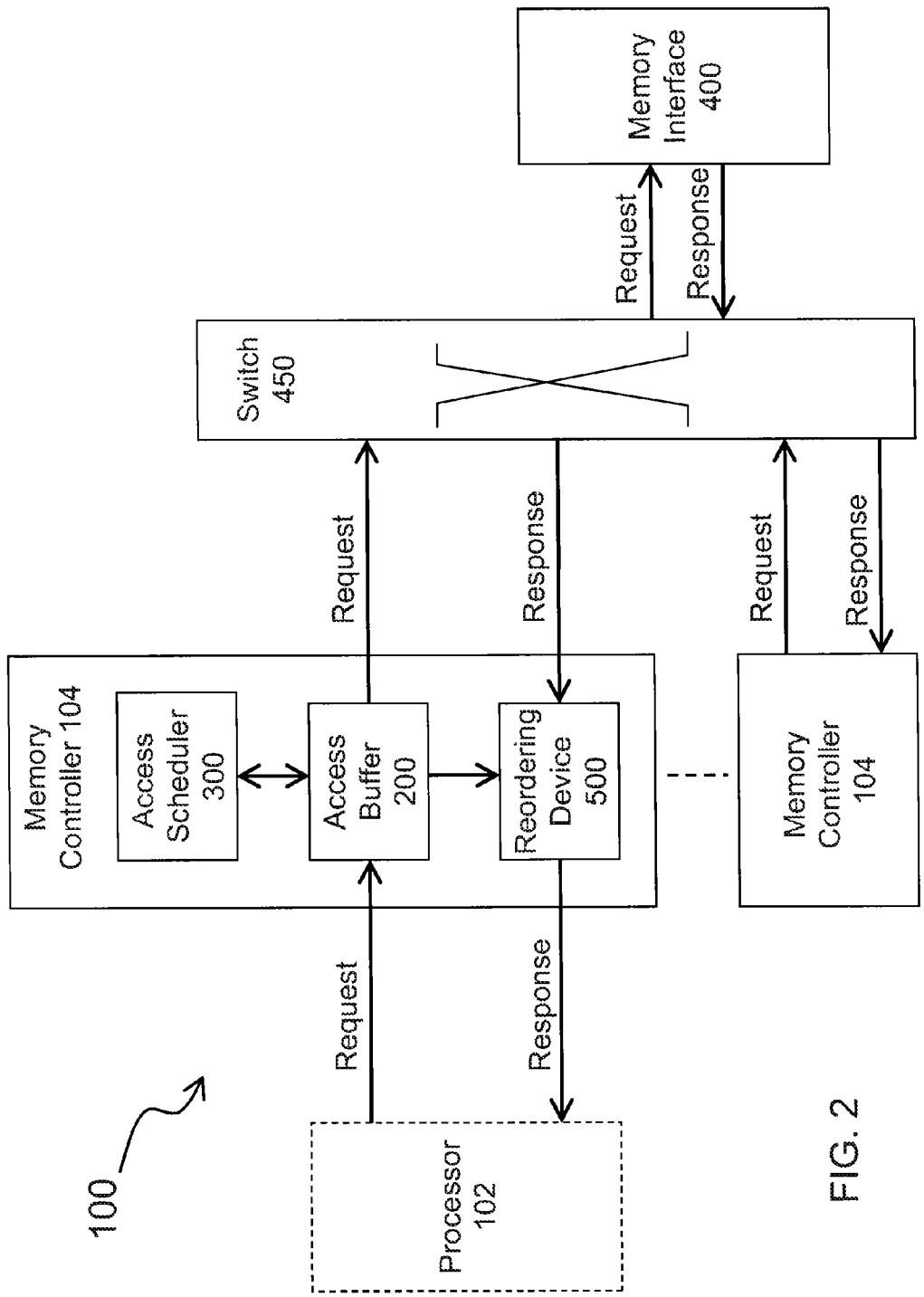
Figure 3:
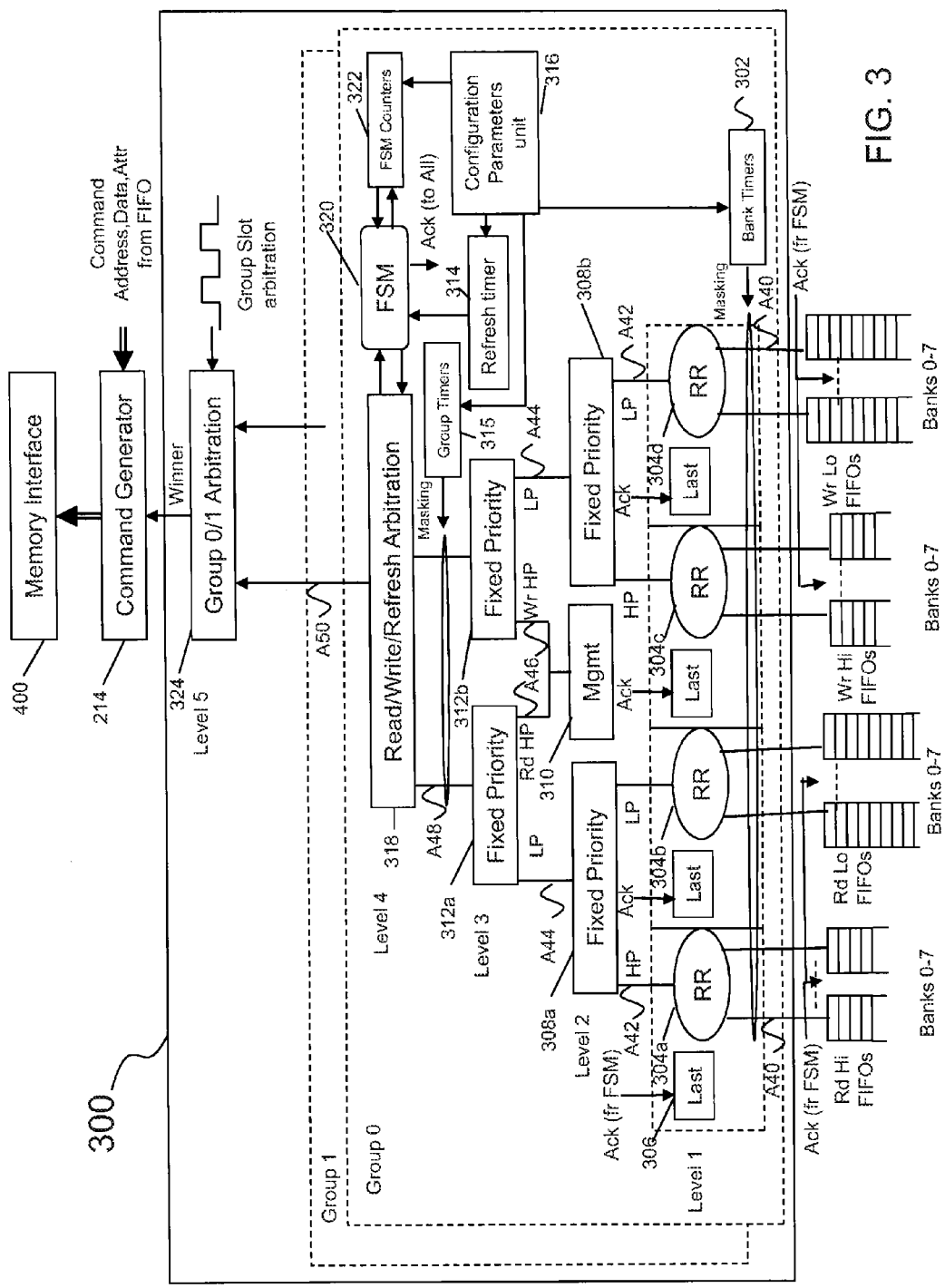
Figure 4:
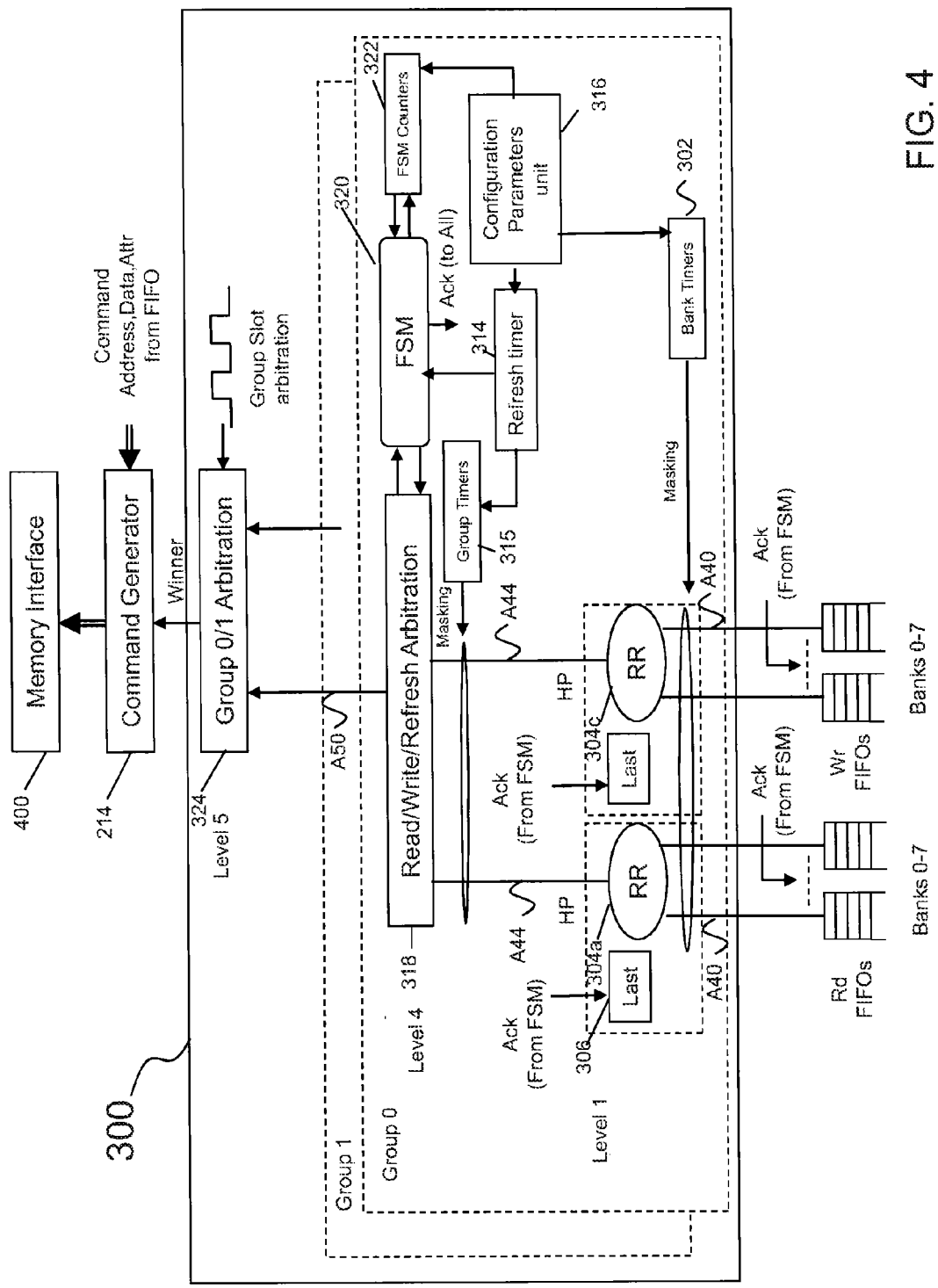
Figure 5:
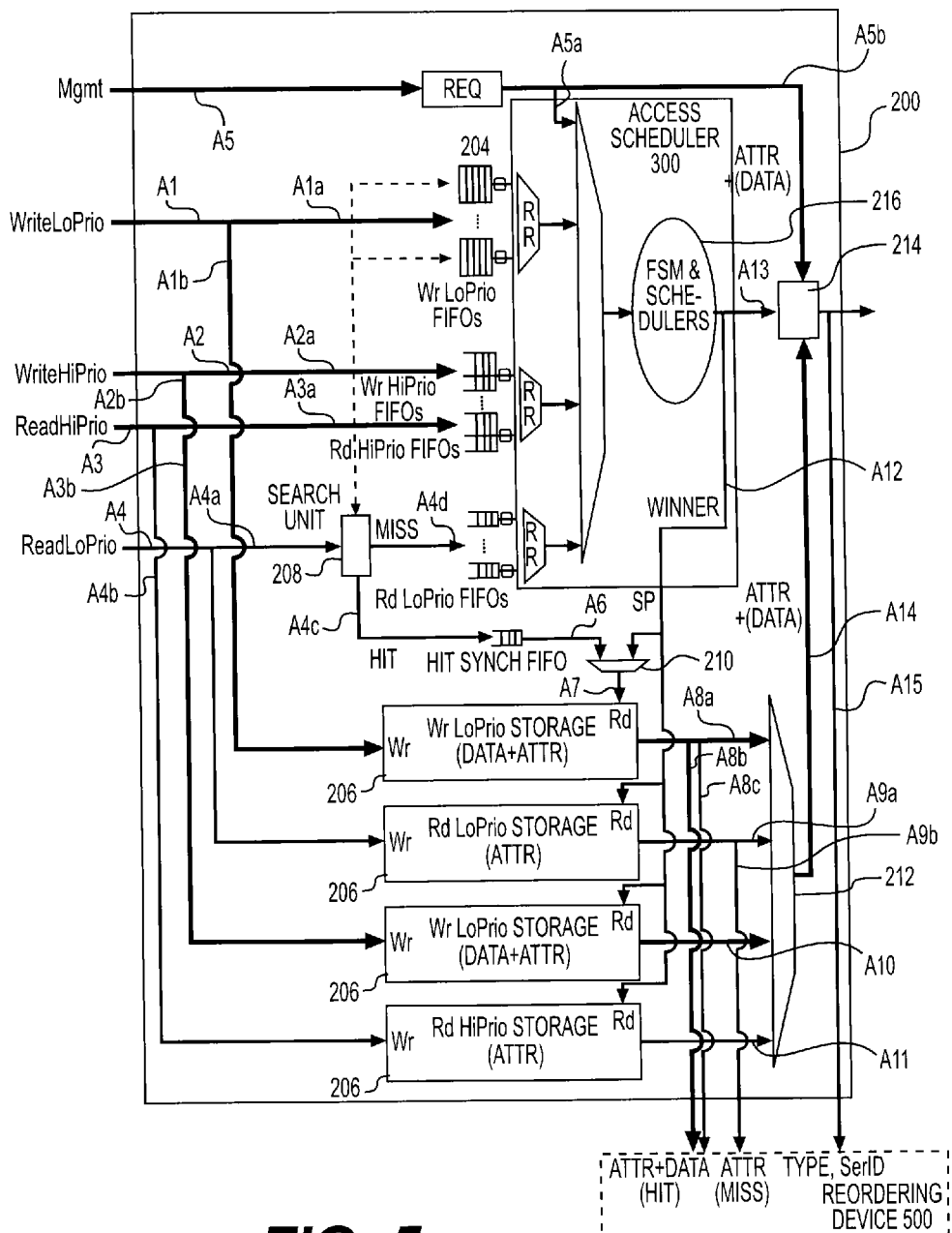
Figure 6:
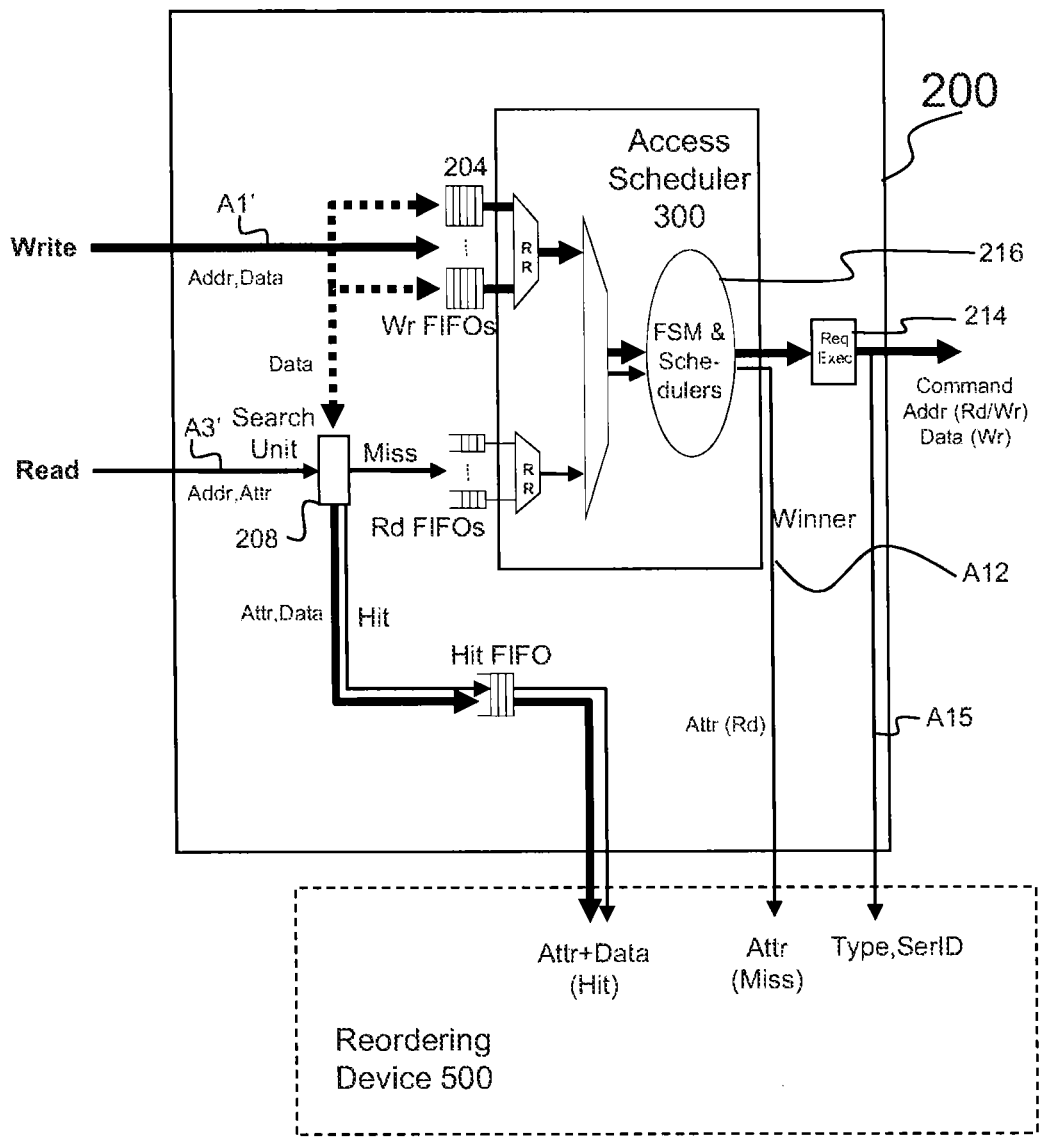
Figure 7:
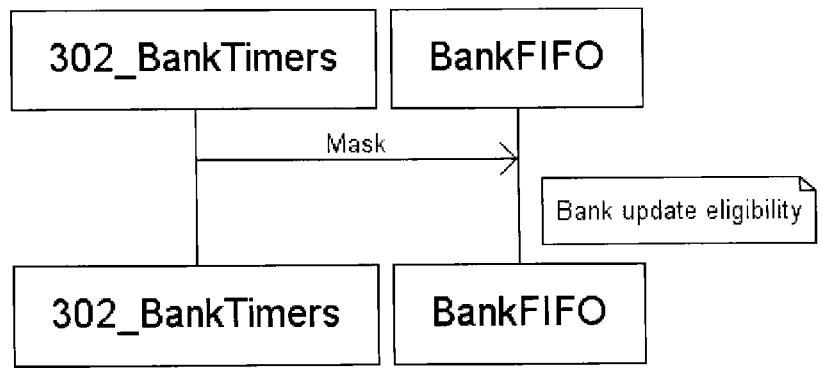
Figure 8:
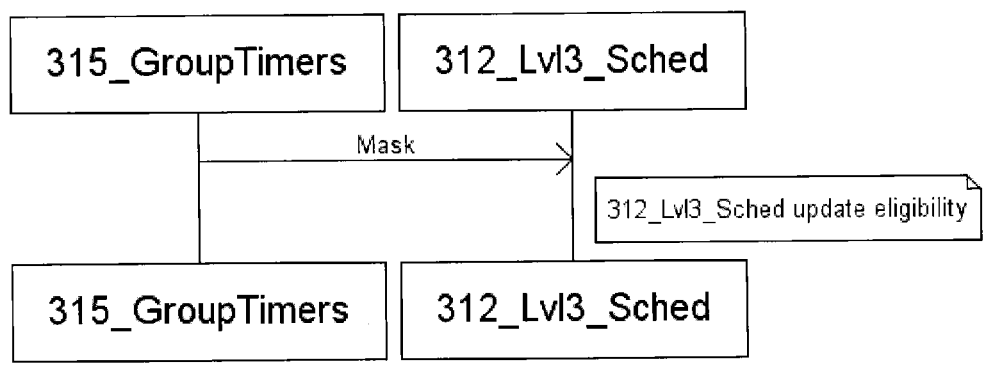
Figure 9A:
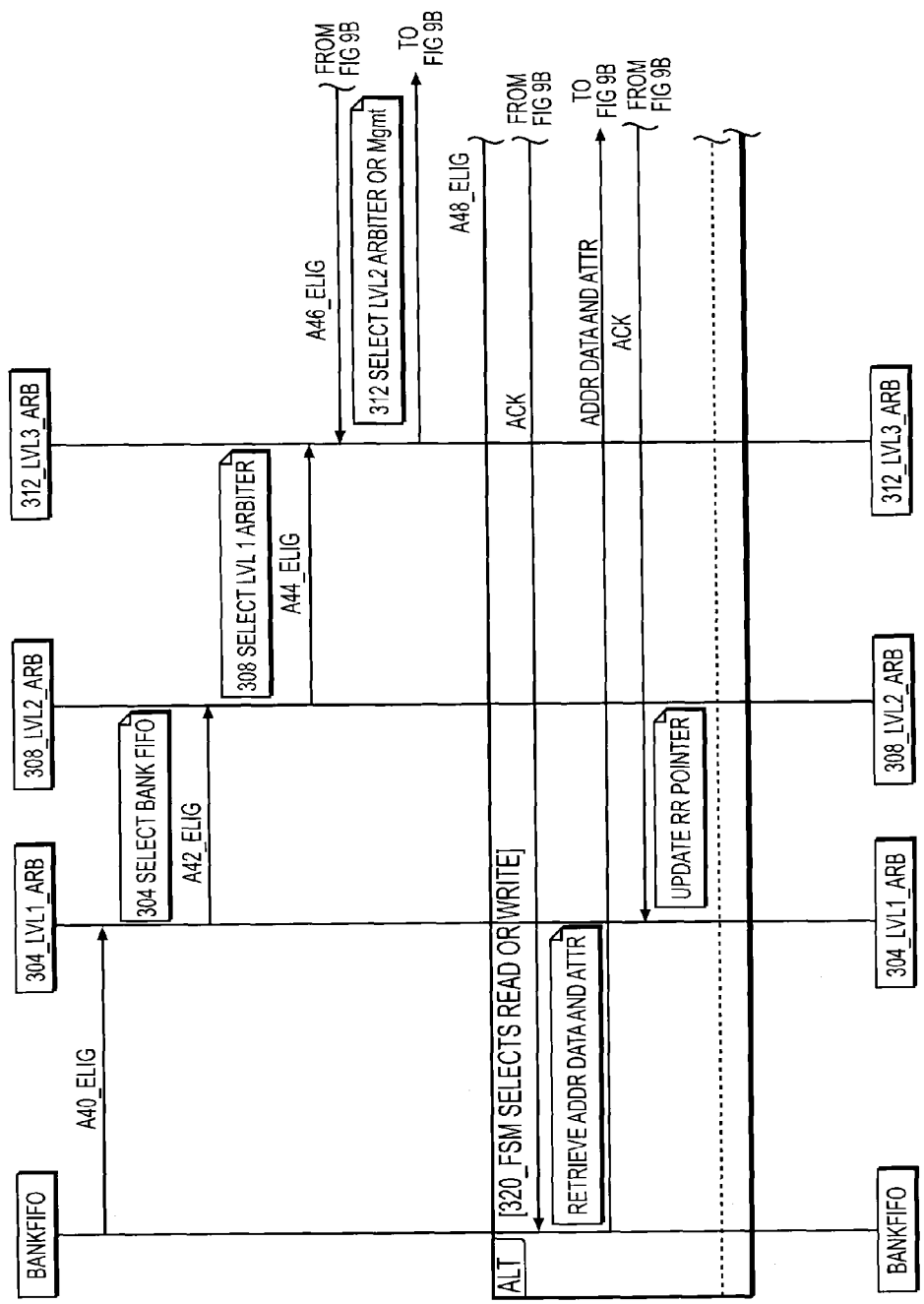
Figure 9B:
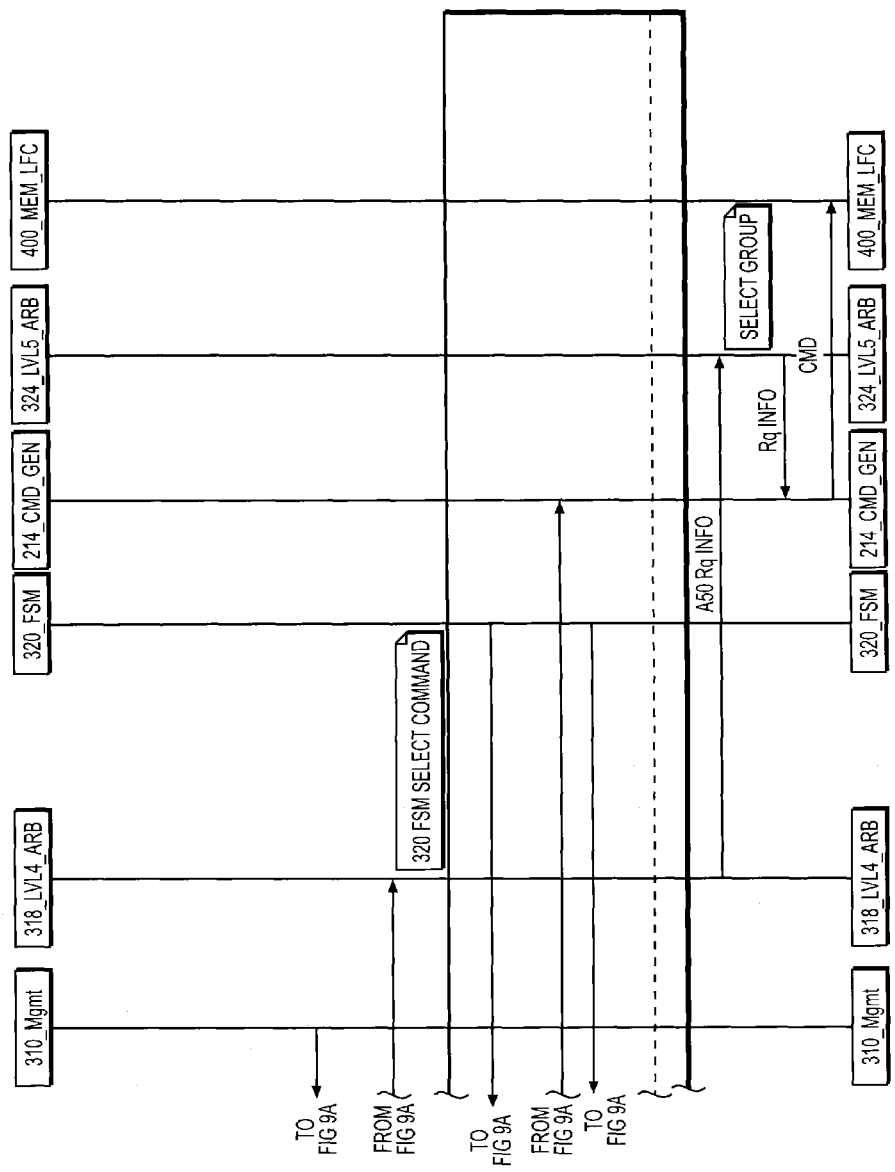

The objects, advantages and effects as well as features of the present invention will be more readily understood from the following detailed description of embodiments of the invention, when read together with the accompanying drawings, in which:

FIG. 1 schematically shows an overview of an embodiment of a data processing system according to the present invention;

FIG. 2 schematically shows an overview of another embodiment of a data processing system according to the present invention;

FIG. 3 schematically shows an embodiment of an access scheduler according to the present invention;

FIG. 4 schematically shows a generalized embodiment of an access scheduler according to the present invention;

FIG. 5 schematically shows an embodiment of an access buffer;

FIG. 6 schematically shows a generalized embodiment of an access buffer;

FIG. 7 schematically shows an exemplary embodiment of a bank timer configured to set mask bits;

FIG. 8 schematically shows an exemplary embodiment of group timers configured to set mask bits; and FIGS. 9A and 9B schematically show a generalized flow diagram of an exemplary operation.

DETAILED DESCRIPTION OF EMBODIMENTS OF THE INVENTION

While the invention covers various modifications and alternative methods, apparatuses and systems, embodiments of the invention are shown in the drawings and will hereinafter be described in detail. However, it is to be understood that the specific description and drawings are not intended to limit the invention to the specific forms disclosed. On the contrary, the scope of the claimed invention is intended to include all modifications and alternative constructions thereof falling within the spirit and scope of the invention as expressed in the appended claims to the full range of their equivalents. In the drawings, the same reference numeral is used for the same or similar feature.

FIG. 1 shows an overview of an embodiment of a data processing system 100 according to the present invention. The data processing system 100 comprises a processor 102 connected to a memory controller 104. The processor 102 is configured to send access requests to the memory controller 104 and to receive access responses from the memory controller 104, as illustrated by the arrows.

The processor 102 may be a central processor unit (CPU) that can execute computer programs, a multiprocessor, a network processor, a programmable pipeline, an IO processor or logical circuitry such as finite state machines.

The memory controller 104 is via a memory interface 400 connected to one or more memory devices 106 and configured to control the access to the one or more memory devices 106. The memory device 106, sometimes also referred to as a packet buffer, may be a long-latency memory with random access constraints, such as a dynamic random access memory (DRAM).

In embodiments, the memory controller 104 comprises an access buffer 200, an access scheduler 300, the memory interface 400, and a reordering device 500, cf. FIG. 1. As previously mentioned, the memory interface 400 is configured to connect the memory controller 104 to the one or more memory devices 106, e.g. DRAMs, and to implement the communication protocol, e.g. the DRAM protocol for the type of device being used.

However, as schematically shown in FIG. 2, it should be understood that in embodiments the memory interface 400 may be arranged external of the one or more memory controllers 104. In such embodiments, the memory interface 400 may be connected to the one or more memory controllers 104 by means of a switch 450, cf. FIG. 2. The switch may be for example a crossbar, a mesh network, a ring or a bus.

Preferably the memory interface 400 is micro-coded, and configured to execute a micro-coded sequence in response to a received command. The command could for example be a read request or a write request received from the access buffer 200.

When used in this description, the wording "micro-code"/ "micro-coded" refers to hardware-level instructions that implement functional primitives for use by other units. The micro-code resides in a special memory (not shown) and translates inputs into sequences of circuit-level control signals on internal circuitry or on input/output (JO) pins.

The access buffer 200 is configured to receive one or more access requests from the one or more processors 102 connected to the memory controller 104. In embodiments, the access buffer 200 is configured to handle access to one or more memory devices 106, e.g. DRAMs.

The access requests may be of different types, e.g. read or write requests having high or low priority and management requests. However it should be understood that other embodiments may comprise other request types, such as DRAM refresh requests.

In embodiments, management requests have the highest priority, and requests relating to writing and reading control information data have in general higher priority than requests relating to writing and reading data, e.g. payload data.

Management requests could for example be read or write requests for configuration parameters or the microcode memory in the memory interface, or read requests for status bits of the memory interface.

Data requests could for example be read or write requests for packet data, e.g. payload data, which is buffered in the DRAM.

Control information data requests could for example be read or write requests for information relating to the data structures storing data, such as linked-list pointers or packet lengths.

In embodiments, the access buffer 200 is first-in-first-out (FIFO) based, i.e. the access buffer 200 comprises a number of FIFO buffers, which in this description text also are referred to as FIFO queues.

If for example the access buffer 200 is configured to handle two memory devices 106, e.g. DRAMs, each having 8 banks, then 16 FIFO queues exist per request type associated with a FIFO queue. The management requests are usually not associated with a FIFO queue, since they have the highest priority and therefore are prioritized without buffering. The read requests having high priority, the read requests having low priority, write requests having high priority and write requests having low priority are each associated with a FIFO queue for each bank of the memory device.

Depending of the request type received from the processor and depending on which memory device and bank of the memory device it is intended for, the request is stored in the FIFO queue corresponding to the request type and the bank of the memory device in question.

The access buffer 200 comprises or is connected to an access scheduler 300. The access scheduler is configured to receive or retrieve request information from the FIFO queues of the access buffer and/or to receive or retrieve management request information from the access buffer. Request information could for example be an indication that a FIFO queue in the access buffer comprises an access request, it could also comprise information that a FIFO queue is empty and information about the length of the request. Preferably, since the management requests have the highest priority, the access scheduler may receive or retrieve the management request information directly without any buffering of the management request information in the access buffer.

The access scheduler is further configured to schedule the requests by means of one or more schedulers or arbiters comprising one or more scheduling algorithms. The scheduled request, also referred to as selected requests, is then sent as a request command to the memory device in question, preferably to the specific bank of the memory device. The request command is preferably generated in the access buffer and sent from the access buffer directly to the memory interface or via the switch.

The memory controller 104 comprises further a reordering device 500 connected to and configured to receive response data from the access buffer 200 and/or from the memory device 106. In embodiments, the reordering device 500 is connected to and configured to receive response data from the memory device 106 via the memory interface 400, and possible also via the switch 450. The reordering device 500 is configured to sort the received response data such that access responses to the processor 102 are made in the same order as the processor 102 issued the corresponding access requests to the memory controller 104.

FIGS. 3 and 4 show embodiments of an inventive access scheduler 300. The inventive access scheduler is configured as a hierarchical scheduler, wherein state information, also referred to as eligibility information, from the leaves propagates toward the root of the tree, as will be described below. In the root a scheduling decision is made in order to select which request to serve, and then, the scheduling decision propagates from the root to a leaf, as will be described below. At the leaf, request information is retrieved and sent to a command generator that generates a DRAM command based on the retrieved request information.

In embodiments, the inventive access scheduler 300 comprises five hierarchical levels, as schematically illustrated in FIG. 3. However, as schematically illustrated in FIG. 4, embodiments of the access scheduler 300 may comprise three hierarchical levels. In FIG. 4 the three levels: Level 1, Level 4 and Level 5, are comprised in the access scheduler 300.

Propagation of eligibility information from the leaves to the root will now be described with reference to FIG. 3.

A FIFO queue, such as one of "Rd Hi FIFOs", "Rd Lo FIFOs", "Wr Hi FIFOs", or "Wr Lo FIFOs", is eligible for scheduling by a scheduler 304 at first level, Level 1, if it is not empty and its bank timer mask permits scheduling.

Further, a first level scheduler 304 at Level 1 is eligible for scheduling by a second level scheduler 308 at Level 2 if any of the FIFOs served by the first level scheduler 304 is eligible. For example, in order for a first level scheduler 304a to be eligible for scheduling by a second level scheduler 308a, one of the read high priority FIFO queues "Rd Hi FIFOs" must be eligible. A second level scheduler 308 at Level 2 is eligible for scheduling by a third level scheduler 312 at Level 3 if any of the second level schedulers 308 at Level 2 served by the third level scheduler 312 at level 3 is eligible.

Further, a third level scheduler 312 at Level 3 is eligible for scheduling by a fourth level scheduler 318 at Level 4 if any of the third level schedulers 312 at level 3 served by the fourth level scheduler 318 at Level 4 is eligible. For the third level scheduler 312 to be eligible, the group timers 315 must permit scheduling. At Level 5, groups at Level 4 are alternated in a cyclical fashion.

Propagation of the scheduling decision from the root to a leaf will now be described with reference to FIG. 3.

For the group, i.e. the DRAM device that is selected at Level 5, a finite state machine (FSM) 320 of the group selects a refresh operation if the counter for refresh, also referred to as a refresh timer 314, has reached a threshold that is configurable in the configuration parameters unit 316. The refresh operation may be delayed until a state is reached where the FSM would otherwise have switched from read to write or idle, or from write to read or idle. If refresh is not selected, and read and/or write is eligible, read/write arbiter 318 selects read or write using e.g. a deficit weighted round-robin (DWRR) scheduling algorithm. Otherwise the scheduler 318 may be idle. If read or write is selected, the third level scheduler 312 at Level 3 that is selected selects the second level scheduler 308 with highest priority among the eligible second level schedulers 308. Then the second level scheduler 308 that is selected selects the first level scheduler 304 with highest priority among the eligible first level schedulers 304. The first level scheduler 304 selects the next eligible FIFO queue in round-robin fashion.

It should be understood that propagation of eligibility information from the leaves to the root and that propagation of the scheduling decision from the root to a leaf function in the same way in access schedulers having another number of hierarchical level than 5.

According to embodiments, the first level, Level 1, comprises one or more bank timers 302, the number of banks timers correspond to the number of banks. The bank timer 302 is configured to set a mask bit for each bank of the memory device 106 when the FIFO queue comprised in the access buffer and associated with the bank is accessed. In FIG. 3, the setting of mask bits is illustrated by the ring around the lines A40 connecting the FIFOs with the first level schedulers 304. By setting a mask bit for the bank when the associated FIFO queue is accessed, the bank cannot be selected for another access until the mask bit is cleared. Further, by means of the bank timer 302 the mask bit is cleared when the DRAM-specific random access time, tRC, expires. Thereby, access errors, such as accessing a bank too early after the previous access to the same bank, can be prevented.

Further, the scheduler 300 comprises one or more first level arbiters 304, e.g. one first level arbiter 304 per access request type associated with a FIFO queue in the access buffer. The FIFO queues propagate eligibility information to the first level arbiters 304. The first level arbiter 304 is configured to by means of a scheduling algorithm, such as round robin scheduling algorithm as illustrated by RR in FIG. 3, to select in a fair manner and based on the request information received, one of the access requests comprised in one of FIFO queues associated with banks 0-7.

Thus, work-conserving round-robin service of banks is provided, with one round-robin per access request type; i.e. one per read high priority request, read low priority request, write high priority request and write low priority request.

Once an access request has been selected, the first level arbiter 304 will propagate eligibility information regarding the FIFO storing request information relating to the selected access request to a second level arbiter 308 comprised in the next level, Level 2.

As schematically illustrated in FIG. 3, the first level arbiter 304a for scheduling read high priority requests is configured to select, based on the request information comprised in one of the 8 FIFO queues "Read Hi FIFOs" associated with banks 0-7, one of the read high priority requests. In the same manner, the first level arbiters 304b, 304c, 304d are configured to select read low priority requests, write high priority requests, and write low priority requests from the FIFO queues "Read Lo FIFOs", "Write Hi FIFOs", and "Write Lo FIFOs", respectively.

In the last storage 306, a pointer from the scheduler 304 is stored. The pointer is configured to tell which of the bank 0-7 was the last bank to be served. After a scheduling decision the last pointer 306 is increased by 1 modulo the number of banks associated with the scheduler, to indicate which bank to be served next by the scheduler 304.

According to embodiments, the second level, Level 2, comprises one or more second level arbiters 308. Preferably, the access scheduler 300 comprises one second level arbiter 308 per request type disregarding high and low priorities, i.e. one per write request and one per read request. Thus, a first second level arbiter 308a is configured to arbiter between read request and a second second level arbiter 308b is configured to arbitrate between write requests.

The second level arbiter 308 is configured to perform arbitration between low priority requests and high priority requests by means of a fixed priority scheduling algorithm, i.e. the second level arbiter 308 is configured to select the request having the highest priority and to propagate eligibility information to a third level arbiter 312 comprised in the next level, Level 3.

Thus, as long as read high priority requests exist, the first second level arbiter 308a will select a read high priority request before a read low priority request is selected.

By the same reasoning, the second second level arbiter 308b is configured to select write high priority requests before selecting a write low priority request.

In the second level, Level 2, the access scheduler 300 also comprises a management request unit 310 configured to propagate management read requests having high priority from the access buffer to the third level scheduler 312a and to propagate eligibility information to the third level scheduler 312b.

According to embodiments, in the third level, Level 3, the access scheduler 300 comprises one or more third level arbiters 312. The third level arbiter 312 is configured to schedule between normal access requests, i.e. read requests and write requests, and management access requests. As previously mentioned, the management access requests are high-priority access requests which may originate from another component than the processor; e.g., from a control plane CPU, connected to the access scheduler/access buffer.

As schematically illustrated in FIG. 3, a first third level arbiter 312a is configured to select between a read request and a read management request, and the second third level arbiter 312b is configured to select between a write request and a write management request. Since a management request has a higher priority than the read request and the write request, the third level arbiters 312 will select a management request as long as a management request is available to select.

Eligibility information is propagated to a fourth level arbiter 318 comprised in the next level, Level 4.

In embodiments, the access scheduler 300 also comprises a refresh timer 314 configured to, based on configuration parameters stored in a configuration parameters unit 316, instruct a finite state machine (FSM) 320 to generate a refresh request. The refresh request could for example be a maintenance request for the DRAM, i.e. a request requesting maintenance of the DRAM to e.g. refresh the content of the memory by an internal electric mechanism. Without refresh the memory content gets corrupted. Refresh requests could be sent periodically and they could be given precedence over other access requests and management requests.

In embodiments, the access scheduler comprises one or more group timers 315. The group timers 315 are configured to set mask bit for a group i.e. a DRAM device, depending on e.g. tFAW, tRRD, tRead2write, tWrite2read, and tCalibration. tFAW restricts the number of row activate commands within a time window and tRRD is the minimum time between two consecutive activation commands to a DRAM device. tRead2write is the minimum time between a read command and a subsequent write command and tWrite2read is the minimum time between a write command and a subsequent read command. tCalibration is the time period between two calibration commands. Calibration commands may for example be executed to compensate for changes in operational conditions, such as temperature changes.

In the fourth level, the access scheduler may comprise the configuration parameters unit 316. The configuration parameters unit 316 is configured to transfer configuration parameters, such as the number of read requests to execute before a number of write requests are to be executed, or the number of burst to read before write, to a finite state machine (FSM) 320 comprised in the fourth level, Level 4. By means of the configuration parameters, the FSM 320 is configured to control when to make reads, writes, refresh or idle.

The FSM is configured to transmit an acknowledge signal, also referred to as an Ack signal, to one or more of the FIFO queues and to one or more last storages 306 associated with the one or more first level arbiters 304, as schematically illustrated in FIGS. 3 and 4. The Ack Signal triggers the retrieval of a request from the selected FIFO. In addition it triggers the updating of the RR pointer in the Last storage 306 of RR Scheduler 304 associated with the selected FIFO.

According to embodiments, the access scheduler comprises in the fourth level, Level 4, a fourth level arbiter 318, the finite state machine (FSM) 320, a FSM timer Counter 322.

The fourth level arbiter 318 is configured to schedule between the requests, i.e. between the write requests, read requests management requests, and refresh requests without taking the priorities into account, i.e. at the fourth level it does not matter whether a request has low priority or high priority. The fourth level arbiter 318 may also be configured to schedule a number of read requests to be executed before a number a write requests are to be executed in order to minimize delays in the memory access, since switching between different access requests (e.g. read, write, management, refresh, and maintenance) takes time and may also require insertion of idle cycles.

In embodiments, the refresh timer 314 is configured to count the number of cycles between refresh requests, and the one or more FSM counters 322 is configured to count the number of write and read requests as well as the number of cycles that needs to be inserted when switching between command types such as read, write and refresh.

The read and write bandwidth are configurable and dynamically shared in a fair, weighed, work-conserving way. Two configurable parameters comprised in the configuration parameters unit 316 are "MaxReads" "MaxWrites". The parameter "MaxWrite" indicate the number of DRAM bursts that are written (if eligible) before turning to serve DRAM reads. The parameter "MaxReads" indicate the number of DRAM bursts that are read (if eligible) before turning to server DRAM writes. In embodiments, "MaxReads" and "MaxWrites" are weights of a deficit weighted round-robin (DWRR) scheduler.

Further, the fourth level arbiter 318 is configured to propagate eligibility information to a fifth level arbiter 324 comprised in a next level, Level 5, of the access scheduler.

According to embodiments, the access scheduler comprises in a fifth level, Level 5, a fifth level arbiter 324 configured to select between access requests to a first memory device 106, also referred to as a first Group 0, and access requests to a second memory device 106, also referred to as a second Group 1. In embodiments, the groups share address bus but have separate data buses. In embodiments, the fifth level arbiter 324 alternates between selecting an access request to the first memory device and to the second memory device.

In order to maximize the utilization of the memory interface, the DRAM devices may thus be organized in groups, e.g. in Group 0 and Group 1. By alternating between the groups, DRAM constraints on the number of row activation commands within a time window as expressed by the tFAW parameter, will not impair memory interface bandwidth. Alternating between groups also prevents bandwidth impairment due to tRRD, i.e. the minimum time between two consecutive row activation commands, and tCCD, i.e. the minimum time between two column commands.

A command generator 214 is arranged in communication with the access scheduler 300 and configured to generate a command based on request information, about the winner from the access scheduler and based on the address, data and attributes associated with the request and retrieved from the FIFO queue. The command is then sent to the DRAM via the memory interface 400.

FIG. 4 schematically illustrates a more generalized embodiment of an inventive access scheduler 300.

As illustrated, the embodiment of the access scheduler 300 comprises in a first level, Level 1, one or more bank timers 302, the number of banks timers correspond to the number of banks. The bank timer 302 is configured to set a mask bit for each bank of the memory device 106, when the FIFO queue comprised in the access buffer and associated with the bank is accessed, as previously described.

Further, the scheduler 300 comprises one or more first level arbiters 304, e.g. one first level arbiter 304 per access request type associated with a FIFO queue in the access buffer. In the shown embodiment, the number of access request types is two: read requests and write requests.

Once an access request has been selected, the first level arbiter 304 will propagate eligibility information regarding the FIFO storing request information relating to the selected access request to a fourth level arbiter 318 comprised in the next level, Level 4, as indicated by the line A44.

In embodiments, the access scheduler 300 also comprises a refresh timer 314, group timers 315, a configuration parameters unit 316, a finite state machine (FSM) 320 and FSM counters 322, as previously described.

The fourth level arbiter 318 is configured to schedule between the requests, i.e. between the write requests, read requests management requests, and refresh requests. The fourth level arbiter 318 may also be configured to schedule a number of read requests to be executed before a number a write requests are to be executed in order to minimize delays in the memory access, since switching between different access requests (e.g. read, write, management, refresh, and maintenance) takes time and may also require insertion of idle cycles.

Further, the fourth level arbiter 318 is configured to propagate eligibility information to a fifth level arbiter 324 comprised in a next level, Level 5, of the access scheduler, as indicated by the line A50.

The fifth level arbiter 324 is configured to select between access requests to a first memory device 106, also referred to as a first Group 0, and access requests to a second memory device 106, also referred to as a second Group 1, as previously described. Request information about the winner is transmitted to the command generator 214 which generates a command based on the request information and based on the address, data, and attributes associated with the request information and stored in a FIFO queue. The command is then sent to the DRAM device via a memory interface 400.

FIG. 5 schematically shows an embodiment of an access buffer 200. The access buffer 200 is preferably first-in-first-out (FIFO) based, i.e. the access buffer 200 comprises a number of FIFO buffers, which in this description text also are referred to as FIFO queues.

The embodiment of the access buffer 200 shown in FIG. 5 is configured to handle two memory devices 106, e.g. DRAMs, each having 8 banks, meaning that 16 FIFO queues exists per request type. Since the number of request types associated with FIFO queues is 4 (the management request is not associated with a FIFO queue), the shown embodiment of the access buffer 200 comprises 64 FIFO queues in total. For the sake of clarity, all of the 64 FIFO queues are not shown in FIG. 5.

However, it should be understood that the number of FIFO queues may be different depending on the number of memory devices to be handled, the number of banks comprised in each memory device and/or the number of request types associated with one or more FIFO queues.

In embodiments, the access buffer 200 comprises a number of write/read low priority/high priority FIFO queues 204: "Wr Lo Prio FIFOs", "Wr Hi Prio FIFOs", "Rd Hi Prio FIFOs", and "Rd Lo Prio FIFOs"; a number of write/read low priority/high priority storages 206: "Wr LoPrio Storage", "Rd LoPrio storage", "Wr HiPrio Storage", and "Rd HiPrio Storage"; a search unit 208, an arbiter 210, a multiplexer, 212, an access scheduler 300, and a command generator 214. The command generator 214 being configured to construct a memory controller command in the format required and to send the generated command to a memory device 106 via the memory interface 400.

In embodiments, the searchable address storages 206 are content-addressable associative memories (CAMs).

Further, it should be understood that in other embodiments, the access scheduler 300 may be arranged external of the access buffer 200 and in communication with access buffer 200.

As schematically illustrated by the rightwards arrows A1-A5 in the left-hand side of FIG. 5, different types of requests, e.g. read/write, high priority/low priority, and management, can be sent from the processor to the access buffer 200. However it should be understood that other embodiments may comprise other request types, such as DRAM refresh requests.

In FIG. 5 the following different request types are shown: a management request "Mgmt"; a write request having a low priority "WriteLoPrio", e.g. a write data request; a write request having a high priority WriteHiPrio", e.g. a write control information data request; a read request having a high priority "ReadHiPrio", e.g. a read control information data request; and a read request having a low priority "ReadLoPrio", e.g. a read data request.

In embodiments, cf. e.g. FIG. 5, a write request comprises data to be written to a memory device, an address corresponding to the address of the memory device where to write the data, and an attribute defining the order of the request in relation to other requests; and a read request comprises an address corresponding to the address of the memory device where to read data and an attribute defining the order of the request in relation to other requests.

In other embodiments, cf. e.g. FIG. 6, a write request does not comprise an attribute. In such embodiments, the write request comprises data to be written to a memory device, and an address corresponding to the address of the memory device where to write the data, and a read request comprises an address corresponding to the address of the memory device where to read data and an attribute defining the order of the request in relation to other requests In embodiments, management requests have the highest priority, and requests relating to writing and reading control information data have in general higher priority than requests relating to writing and reading data, e.g. payload data.

Management requests could for example be read or write requests for configuration parameters or the microcode memory in the memory interface.

Data requests could for example be read or write requests for packet data, e.g. payload data, which is buffered in the DRAM.

Control information data requests could for example be read or write requests for information relating to the data structures storing data, such as linked-list pointers or packet lengths.

As schematically illustrated in FIG. 5, when the access buffer 200 receives from the processor 102 a request "WriteLoPrio", as indicated by the arrow A1, to write e.g. low priority data to the memory device 106, the address of the low priority data will be written to one of the FIFO queues "Wr LoPrio FIFOs" comprised in the access buffer 200, as indicated by the arrow A1a. Further, data and attribute (Attr) of the write low priority request will be stored in a searchable address storage "Wr LoPrio Storage" 206 comprised in the access buffer 200, as indicated by the arrow A1b.

Further, as schematically illustrated in FIG. 5, when the access buffer 200 receives from the processor a request "WriteHiPrio", as indicated by the arrow A2, to write e.g. control information data to the memory device 106, the address of the request "WriteHiPrio" will be written to one of the FIFO queues "Wr HiPrio FIFOs" comprised in the access buffer 200, as indicated by the arrow A2a. Further, the data and attribute of the request "WriteHiPrio" will be stored in a searchable address storage "Wr HiPrio Storage" 206 comprised in the access buffer 200, as indicated by the arrow A2b.

Furthermore, as schematically illustrated in FIG. 5, when the access buffer 200 receives from the processor a request "ReadHiPrio", as indicated by the arrow A3, to e.g. read control information data from the memory device 106, the address of the request "ReadHiPrio" will be written to one of the FIFO queues "Rd HiPrio FIFOs" comprised in the access buffer 200, as indicated by the arrow A3a. Further, the attribute of the request "ReadHiPrio" will be stored in a searchable address storage "Rd HiPrio Storage" 206 comprised in the access buffer 200, as indicated by the arrow A3b.

As schematically illustrated in FIG. 5, when the access buffer 200 receives from the processor a request "ReadLoPrio", as indicated by the arrow A4, to e.g. read data information from the memory device 106, the access buffer 200 is configured to by means of the search unit 208, search (as illustrated by the dotted arrows) the FIFO queues "Wr LoPrio FIFOs" to determine if the address of the request "ReadLoPrio" is comprised in one of the FIFO queues "Wr LoPrio FIFOs" or not.

If the address of the data to be read is in one of the FIFO queues "Wr LoPrio FIFOs", the search unit 208 detects a "hit". The search unit 208 removes the address from the FIFO queue "Wr LoPrio FIFOs" and the data and attribute to be read is read from the data storage "Wr LoPrio Storage". Before reading from the "Wr LoPrio Storage", the "Hit" request could be written to a FIFO queue "Hit Synch FIFO", as indicated by the arrow A4c, and be scheduled by means of an arbiter 210, as indicate by the arrow A6, in order to read the data and attribute from the storage "Wr LoPrio Storage" in an ordered and scheduled manner, as indicated by the arrow A7. When the data and attribute have been read from the storage "Wr LoPrio Storage", the data and attribute are sent to the reordering device 500, as indicated by the arrow A8b and A8c respectively. Thereafter the reordering device 500 is configured to, in the correct order, transmit an access response to the processor 102, the response being based on the data and the attribute read, as indicated by the notation "Attr+Data (Hit)" in the reordering device 500 in FIG. 5.

The arbiter 210 is configured to perform scheduling by means of a strict priority scheduling algorithm. In embodiments, the access request being selected by the access scheduler 300 should be prioritized over the "Hit" request, since the bandwidth of the memory interface should be optimized. In that case "Hit" request can wait in the Hit Synch FIFO for available time slot (e.g. Access Scheduler read command).

If the address to be read is not in one of the FIFO queues, the search unit 208 detects a "miss". The address of the data to be read is then written to one of the FIFO queues "Rd LoPrio FIFOs" comprised in the access buffer 200, as indicated by the arrow A4d. Further, the attribute (Attr) of the request will be stored in a storage "Rd LoPrio Storage" comprised in the access buffer 200, as indicated by the arrow A4b.

As illustrated in FIG. 5, the access scheduler 300 is configured to select one of the access requests based on the information in the FIFO queues 204, i.e. the "Wr LoPrio FIFOs", "Wr HiPrio FIFOs", "Rd HiPrio FIFOs", and "Rd LoPrio FIFOs", of the access buffer 200 and based on a possible address of a management request received by the access scheduler 300, as indicated by the arrow A5a. The access scheduler 300 is configured to, by means of one or more arbiters, select one of the access requests based on a scheduling algorithm, e.g. a round-robin scheduling algorithm as indicated with "RR" in FIG. 5, or first-come, first-serve, or another suitable scheduling algorithm. The access scheduler may comprise further schedulers and a finite state machine (FSM) 216 configured to perform write/read/refresh request scheduling and to make sure that the DRAM protocol is not violated.

However, as indicated by the arrow A5b, the data and attribute of the management request may be directly sent to the command generator 214 configured to generate a command which by means of the memory interface 400 is sent to the memory device 106.

Further, as illustrated by the arrow A13, the access scheduler 300 is configured to transmit the address of a selected access request to the command generator 214. When an access request is selected by the access scheduler 300, the access buffer 200 is configured to clear the address of the access request from the FIFO queue and to read data and/or attribute of the selected request from one of the storages 206.

If for example the selected access request is a "WriteLoPrio", i.e. a write low priority request, the access scheduler 300 will communicate the address of the selected access request comprised in the "Wr LoPrio FIFO" to the "Wr LoPrio Storage", as indicated by the arrow A12, and to the command generator 214, as illustrated by the arrow A13. Further, as shown in FIG. 3 the address may pass the arbiter 210, in order to prioritize reading in the "Wr LoPrio Storage" based on a hit detected by the search unit 208 or based on selected write low priority request from access scheduler 300, before the data and attribute are read and removed from the "Wr LoPrio Storage". When the data and attribute have been read from the "Wr LoPrio Storage" the data and attribute are transmitted to the command generator 214, as indicated by the arrows A8a and A14. Further, when the data and attribute have been read from the "Wr LoPrio Storage" the data and attribute are transmitted to reordering device 500 as indicated by the arrows A8b and A8c.

In embodiments, the data and attribute are transmitted to the command generator 214 via the multiplexer 212 in order to select between different data and attributes transmitted from the different data storages, as indicated by the arrows A8a, A9a, A10, and A11.

When the data and attribute read from the "Wr LoPrio Storage" is received in the command generator 214 it will be combined with the address read from the "Wr LoPrio FIFO" into a write low priority command which is transmitted to the memory device.

Further, if for example the selected access request is a "WriteHiPrio", i.e. a write high priority request, the access scheduler 300 will communicate the address of the write high priority request comprised in the "Wr HiPrio FIFO" to the "Wr HiPrioStorage", as indicated by the arrow A12, and to command generator 214, as illustrated by the arrow A13. When the data and attribute have been read and removed from the "Wr HiPrio Storage" the data and attribute are transmitted to the command generator 214, as indicated by the arrows A10 and A14.

Possibly, the data and attribute are transmitted to the command generator 214 via the multiplexer 212 in order to select between different data and attributes transmitted from the different data storages, as indicated by the arrows A8a, A9a, A10, and A11.

When the data and attribute from the "Wr HiPrio Storage" is received in the command generator 214 it will be combined with the address read from the "Wr HiPrio FIFO" into a write high priority command which is transmitted to the memory device.

Furthermore, if for example the selected access request is a "ReadHiPrio", i.e. a read high priority request, the access scheduler 300 will communicate the address of the read high priority request stored in the "Rd HiPrio FIFO" corresponding to the selected access request to the "Rd Hi Prio Storage", as indicated by the arrow A12, and to the command generator 214, as illustrated by the arrow A13. When the attribute has been read and removed from the "Rd HiPrioStorage" the attribute is transmitted to the command generator 214, as indicated by the arrows A11 and A14. Possibly, the attribute is transmitted to the command generator 214 via the multiplexer 212 in order to select between different data and attributes transmitted from the different data storages, as indicated by the arrows A8a, A9a, A10, and A11. When the attribute read from the "Rd HiPrio Storage" is received in the command generator 214 it will be combined with the address read from the "Rd HiPrio FIFO" into a read high priority command which is transmitted to the memory device.

If for example the selected access request is a "ReadLoPrio", i.e. a read low priority request, the access scheduler 300 will communicate the address of the "Rd LoPrio FIFO" corresponding to the selected access request to the "Rd LoPrio Storage", as indicated by the arrow A12, and to the command generator 214, as illustrated by the arrow A13. When the attribute has been read and removed from the "Rd LoPrio Storage" the attribute is transmitted to the command generator 214, as indicated by the arrows A9a and A14. Further, the attribute is also transmitted to the reordering device 500 as illustrated by the arrow A9.

Possibly, the attribute is transmitted to the command generator 214 via the multiplexer 212 in order to select between different data and attributes transmitted from the different data storages, as indicated by the arrows A8a, A9a, A10, and A11.

When the attribute read from the "Rd LoPrio Storage" is received in the command generator 214 it will be combined with the address read from the "Rd LoPrio FIFO" into a read low priority command which is transmitted to the memory device.

When the command is sent from the command generator 214 to the memory device, information about the request type, e.g. write/read low/high priority request, "Type", sent and about the serial identity of the request, "SerID", is sent to the reordering device 500, as indicated by the arrow A15.

In embodiments, SerID is an attribute that is set by the processor. It is used to identify the response back to the processor. In addition it is used by the reordering device 500 to restore the original order, which may be broken by the access scheduler. For example, the processor may increment SerID by one for each request until a maximum value such as 65 535 is reached, whereafter SerID is reset to 0 and incrementing by one continues.

The reordering device 500 is configured to use the attributes received to allocate an address in the reordering device for the order of the access request associated with the attribute. Thus, when an access response is received in the reordering device 500 the attribute can be used to know when to sent the access response to the processor. Thus by means of the attribute of the request the order of the request in relation to other requests sent from the processor is known. If for example, the order of the request is second in a sequence of requests, then the response from the memory device to this request should be sent to the processor after the response to the first request has been sent and before the response to the third request is sent.

FIG. 6 shows a generalized embodiment of an access buffer 200 configured to handle received write requests and read requests, as schematically illustrated by the arrow A1' and A3', respectively. The access buffer 200 comprises a number of FIFO queues, e.g. write, read and hit FIFO queues, 204, a search unit 208, an access scheduler 300 and a command generator 214. Further, the access buffer is connected to a reordering device 500 configured to function as previously described.

When a write request comprising an address and data is received, as illustrated by the arrow A1', the address and the data of the write request are stored in one of the write FIFO queues "Wr FIFOs".

When a read request comprising address and attribute is received, as illustrated by the arrow A3', the search unit 208 is configured to search the "Wr FIFOs" for an address matching the address of the read request.

If such an address is found, the search unit 208 detects a hit and transmits the attribute of the read request and the address to the reordering device 500, possibly via a hit FIFO queue "Hit FIFO".

If such an address is not found, the search unit 208 detects a miss, and stores the address and the attribute in one of the read FIFO queues "RD FIFOs".

As previously described, the access scheduler 300 is configured to select one of the requests.

If the selected request is a write request, the address and data is retrieved from the write FIFO and sent to the command generator 214 for generating a write command.

If the selected request is a read request, the attribute is sent to the reordering device 500 and the address is sent to the command generator 214 for generating a read command.

The command generator 214 is configured to send the generated commands to the memory device and to send request type, .e.g. write or read, "Type", and SerID to the reordering device 500.

Further, embodiments of the access buffer may be configured to have one or more FIFO queues having a backpressure threshold. If the fill level of a FIFO queue exceeds its backpressure threshold, the access buffer is configured to communicate this backpressure to the processor. Thereby the processor is configured to stop further access requests of the same type, e.g. read or write, or read or write with priority, to the access buffer until the access buffer has communicated to the processor that fill level of the FIFO queue has returned to a level below the threshold. The back pressure level should be set to accommodate the largest unstoppable request stream to one of the FIFOs. If for example, the FIFO may comprise 16 requests and the unstoppable amount is 5 requests, the back pressure threshold should be set to 11 requests.

Furthermore, embodiments of the access buffer may be configured to have one or more FIFO queues having a panic threshold. If the maximum fill level of a write FIFO queue or a read FIFO queue grows above a panic threshold, weights for reading and writing are automatically changed in the access scheduler such that write or read gets higher relative bandwidth share. When the fill level returns to a level below the threshold, panic mode is left and the weights are reset to the normal values.

What is claimed is:

1. An apparatus for scheduling memory accesses for one or more memory devices, comprising:
   a set of queues configured to store memory access requests, wherein each queue is associated with at least one memory bank or memory device in the one or more memory devices; and
   a plurality of level schedulers configured to select memory access requests from the set of queues to send to the one or more memory devices;
   wherein each level scheduler is configured to perform a different selection operation.

2. The apparatus of claim 1, wherein the set of queues includes queues for storing different types of requests including queues for storing read requests and queues for storing write requests.

3. The apparatus of claim 1, wherein the set of queues includes queues for storing different priority requests, including queues for higher priority requests and queues for lower priority requests.

4. The apparatus of claim 1,
   wherein a first level scheduler of the plurality of level schedulers is configured to select a request from a queue in the set of queues and to propagate eligibility information regarding the queue to a next hierarchical level; and
   wherein a higher level scheduler of the plurality of level schedulers is configured to receive the propagated eligibility information, and to select a request based on the propagated eligibility information.

5. The apparatus of claim 1, wherein a given level scheduler is configured to select a refresh request to send to a memory device, wherein the refresh request is generated based on a refresh timer and is given precedence over other types of requests.

6. The apparatus of claim 1, wherein a given level scheduler is associated with a finite state machine which is configured to control:
   a number of read requests to be executed before switching to write requests; and
   a number of write requests to be executed before switching to read requests.

7. The apparatus of claim 1, wherein a given level scheduler is configured to select between access requests to a first memory device and access requests to a second memory device.

8. The apparatus of claim 1, wherein a given level scheduler is configured to select between lower priority requests and higher priority requests.

9. The apparatus of claim 1, wherein a given level scheduler is configured to receive management requests from a management request unit and to select between management requests and memory requests.

10. The apparatus of claim 1, including one or more timers, wherein a given timer is configured to set a mask indicator for a given bank or memory device when the given bank or memory device is accessed, wherein the mask indicator prevents the given bank or memory device from being accessed for a time period.

11. The apparatus of claim 10, wherein using the mask indicator facilitates one or more of the following:
- restricting a number of row activate commands that occur within a given time window;
- enforcing a minimum time between a read command and a subsequent write command;
- enforcing a minimum time between a write command and a subsequent read command; and
- enforcing a minimum time between two calibration commands.

12. A computer system, comprising:
- a processor;
- a memory controller;
- a memory including one or more memory devices; and
- a memory access scheduler including,
  - a set of queues configured to store memory access requests, wherein each queue is associated with at least one memory bank or memory device in the one or more memory devices; and
  - a plurality of level schedulers configured to select memory access requests from the set of queues to send to the one or more memory devices;
  - wherein each level scheduler is configured to perform a different selection operation.

13. The computer system of claim 12, wherein the memory access scheduler is incorporated into the memory controller.

14. A method for scheduling memory accesses to one or more memory devices, comprising:
- storing memory access request information to a set of queues, wherein each queue is associated with at least one memory bank or memory device in the one or more memory devices;
- using a plurality of level schedulers to select a memory access request from the set of queues, wherein each level scheduler is configured to perform a different selection operation; and
- sending the selected memory access request to the one or more memory devices.

15. The method of claim 14, wherein the set of queues includes queues for storing different types of requests including queues for storing read requests and queues for storing write requests.

16. The method of claim 14, wherein the set of queues includes queues for storing different priority requests, including queues for higher priority requests and queues for lower priority requests.

17. The method of claim 14,
- wherein a first level scheduler of the plurality of schedulers is configured to select a request from a queue in the set of queues and to propagate eligibility information regarding the queue to a next hierarchical level; and
- wherein a higher level scheduler of the plurality of schedulers is configured to receive the propagated eligibility information, and to select a request based on the propagated eligibility information.

18. The method of claim 14, wherein a given level scheduler is configured to select a refresh request to send to a memory device, wherein the refresh request is generated based on a refresh timer and is given precedence over other types of requests.

19. The method of claim 14, wherein a given level scheduler is associated with a finite state machine which is configured to control:
- a number of read requests to be executed before switching to write requests; and
- a number of write requests to be executed before switching to read requests.

20. The method of claim 14, wherein a given level scheduler is configured to select between access requests to a first memory device and access requests to a second memory device.

21. The method of claim 14, wherein a given level scheduler is configured to select between lower priority requests and higher priority requests.

22. The method of claim 14, wherein a given level scheduler is configured to receive management requests from a management request unit and to select between management requests and memory requests.

23. The method of claim 14, including one or more timers, wherein a given timer is configured to set a mask indicator for a given bank or memory device when the given bank or memory device is accessed, wherein the mask indicator prevents the given bank or memory device from being accessed for a time period.

* * * * *